May 23, 1933.  E. J. WIENKE  1,911,134
EXPOSURE SHUTTER FOR MOTION PICTURE PROJECTING APPARATUS
Filed March 9, 1928   4 Sheets-Sheet 1

May 23, 1933.  E. J. WIENKE  1,911,134

EXPOSURE SHUTTER FOR MOTION PICTURE PROJECTING APPARATUS

Filed March 9, 1928  4 Sheets-Sheet 3

May 23, 1933. E. J. WIENKE 1,911,134
EXPOSURE SHUTTER FOR MOTION PICTURE PROJECTING APPARATUS
Filed March 9, 1928 4 Sheets-Sheet 4
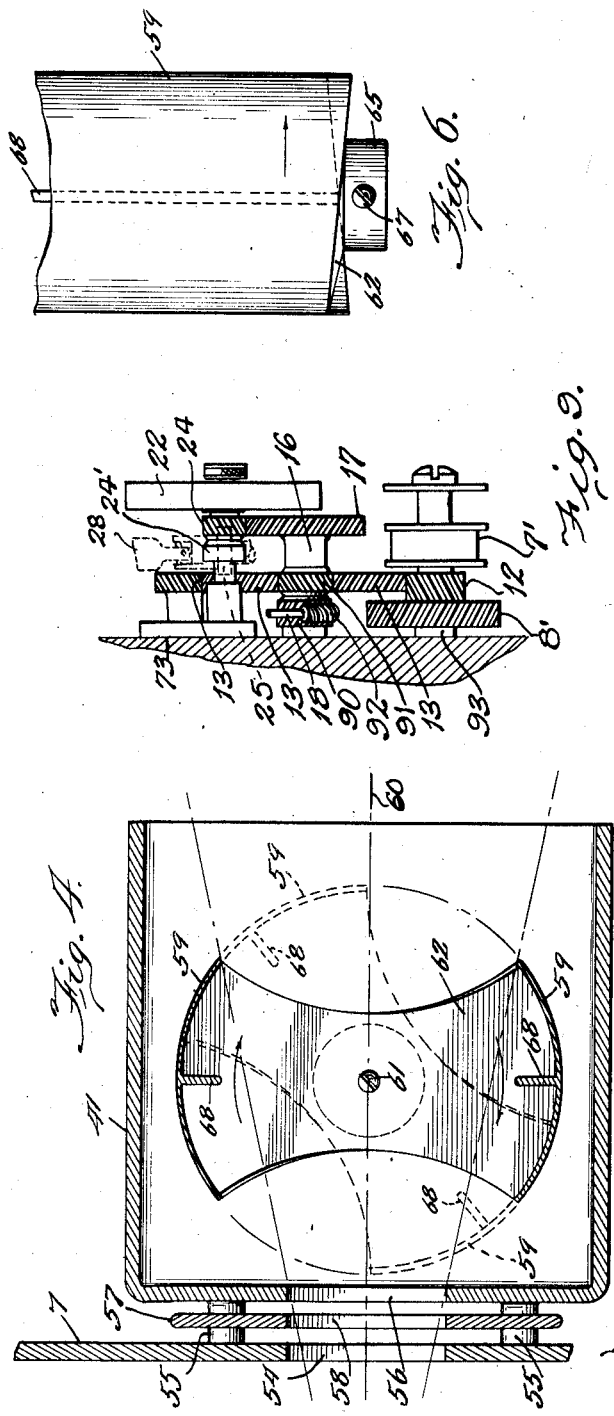
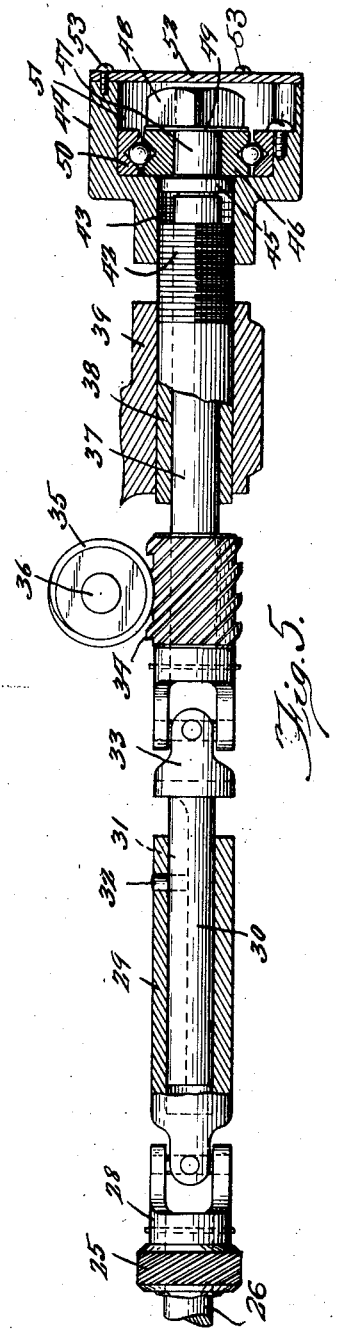

Patented May 23, 1933

1,911,134

UNITED STATES PATENT OFFICE

EMIL J. WIENKE, OF CHICAGO, ILLINOIS, ASSIGNOR TO ENTERPRISE OPTICAL MFG. CO., OF CHICAGO, ILLINOIS, A CORPORATION OF ILLINOIS

EXPOSURE SHUTTER FOR MOTION PICTURE PROJECTING APPARATUS

Application filed March 9, 1928. Serial No. 260,347.

My present invention relates in general to motion picture projecting apparatus and has particular reference to a new exposure shutter for such apparatus.

The primary object of my invention is to provide a shutter for intermittently intercepting the projection of the picture during certain definite periods in the movement of the film.

One of the important features of my invention resides in mounting my new type of shutter between the light source and the film which protects the film against the intensity of the light beam and thus prevents warping the film.

A further object of my invention is to provide a shutter which will develop a more efficient and quick-acting cut-off, so to speak, with less flickering in the projected image on the screen, than has heretofore been possible with the disc type of shutter in which a single blade performs the entire cutting off effect as a result of being rotated in front of the lens.

Still another important object of my invention is to provide means in association with the shutter to dissipate the accumulated heat from the metal structure around the film aperture in the projector and also diffuse the rising heat rays which are sometimes noticeable on the projected image. This is not possible with the commonly used disc type of shutter due to not only its position but also its construction.

Still another object of my invention is to provide a shutter which may be mounted on a removable panel or the like on the projector and with the mounting so constructed as to enable the shutter to be removed with the panel as a unit.

Still another object of the invention is to provide a shutter which will also serve as a heat shield for the so-called film gate of the projector and also as a light shield.

Another object of the invention is to provide a shutter of the class described which may be adjusted while in operation.

Other objects of the invention will appear hereinafter, the novel features and combinations being set forth in the appended claims.

In the accompanying drawings, which illustrate a preferred embodiment of my invention:—

Fig. 4 is a view in vertical section of my shutter showing its relative position to the light openings in the projector;

Fig. 5 is a detail view in horizontal section showing the driving mechanism for my shutter;

Fig. 6 is a top plan view of a portion of my shutter;

Fig. 7 is a top plan view of a modified form of my shutter;

Fig. 8 is a view in cross section of the modified type of shutter; and

Fig. 9 is a plan view showing part of the film driving mechanism.

Figure 1:
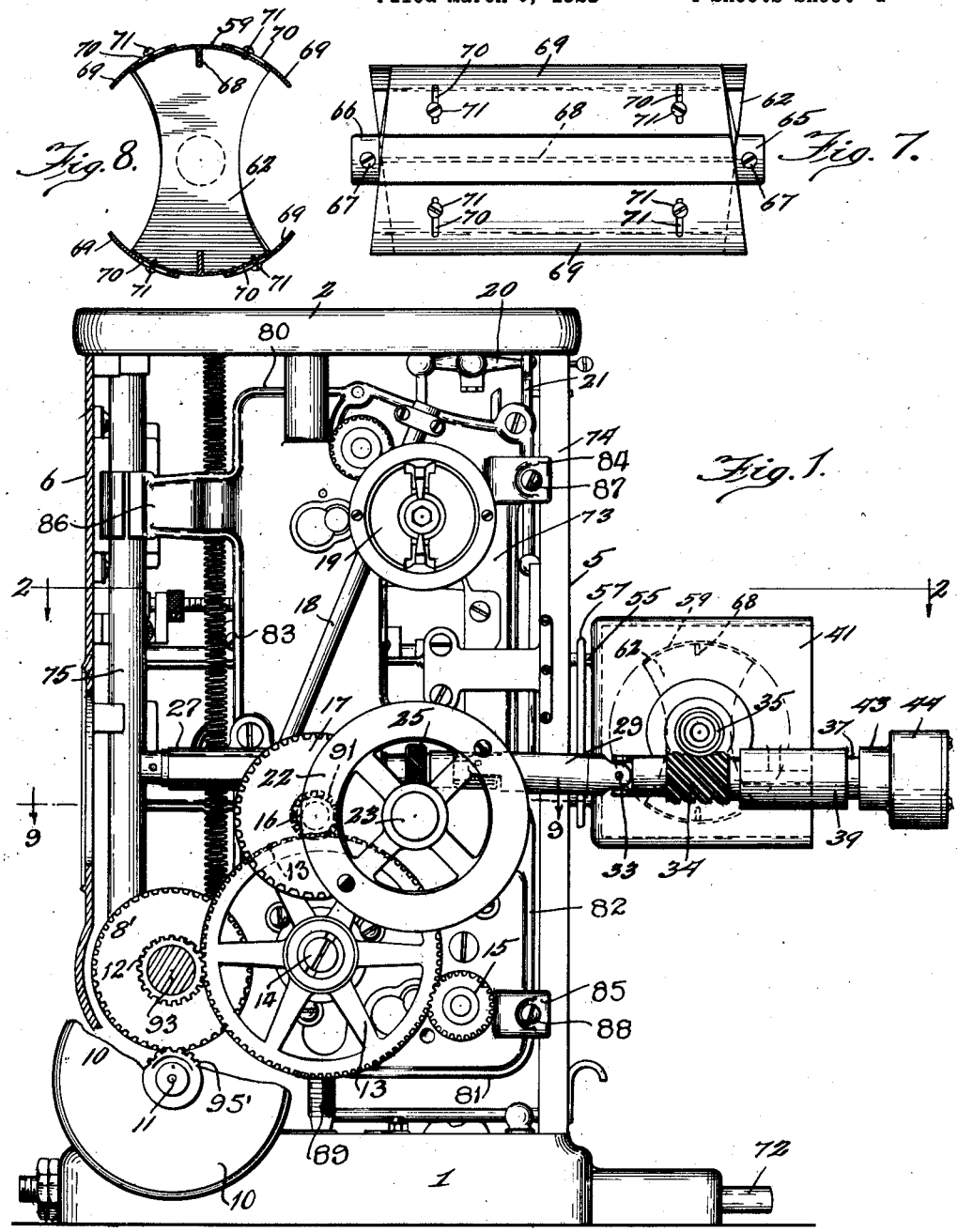
Fig. 1 is a view in side elevation of one type of projector illustrating the application of my invention.
Figure 2:
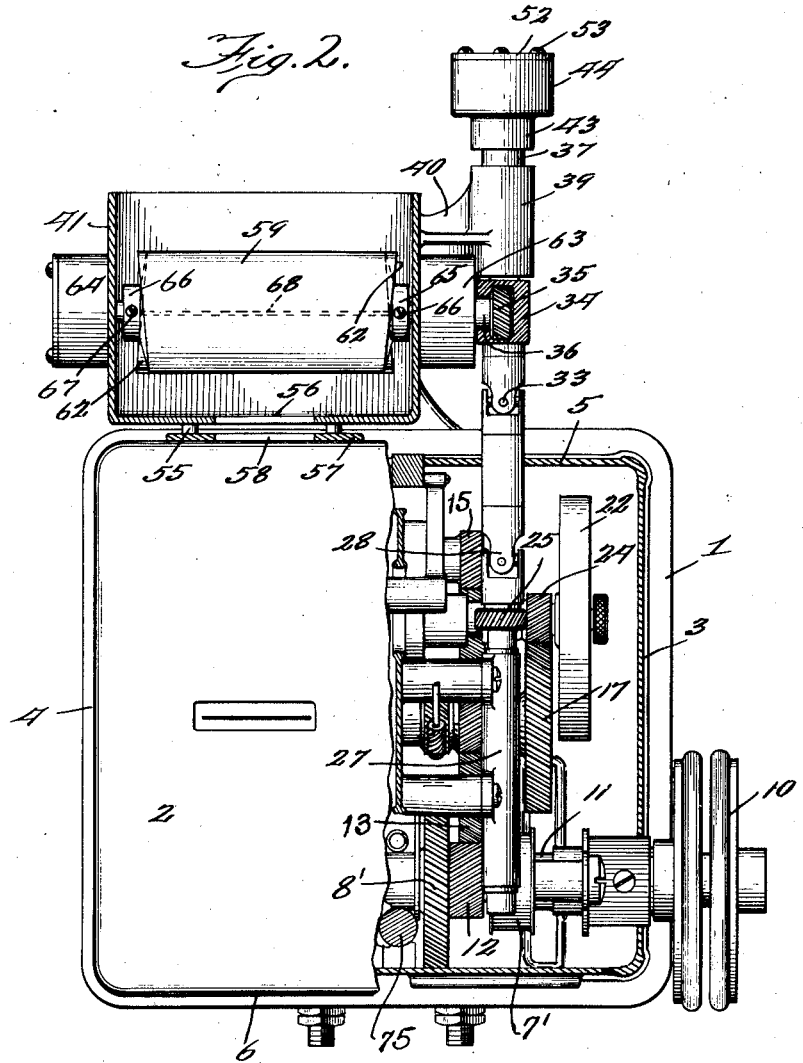
Fig. 2 is a horizontal section on line 2—2 of Fig. 1.

In order to illustrate the application of my shutter to a projector, I have selected the motiograph projector as a prime example of how the shutter may be reduced to practice. I wish it to be clearly understood, however, that this is simply an illustrative embodiment and that the use of my shutter is in no way confined to this particular type of projector. Using this illustration as a convenient way of explaining the construction and advantages of my shutter, I will first describe the important structural features of this motiograph projector in order to bring out the co-operative relationship between the projector and my shutter.

This motiograph projector embodies in its construction a four-sided casing having a base 1, top 2, two side walls 3 and 4, a front wall 5 and a back wall 6. Of course, the walls 5 and 6 may be reversed in order; that is to say, it may be just as well to call the wall 5 a back wall and the wall 6 a front wall. This is of no importance, however.

Figure 3:
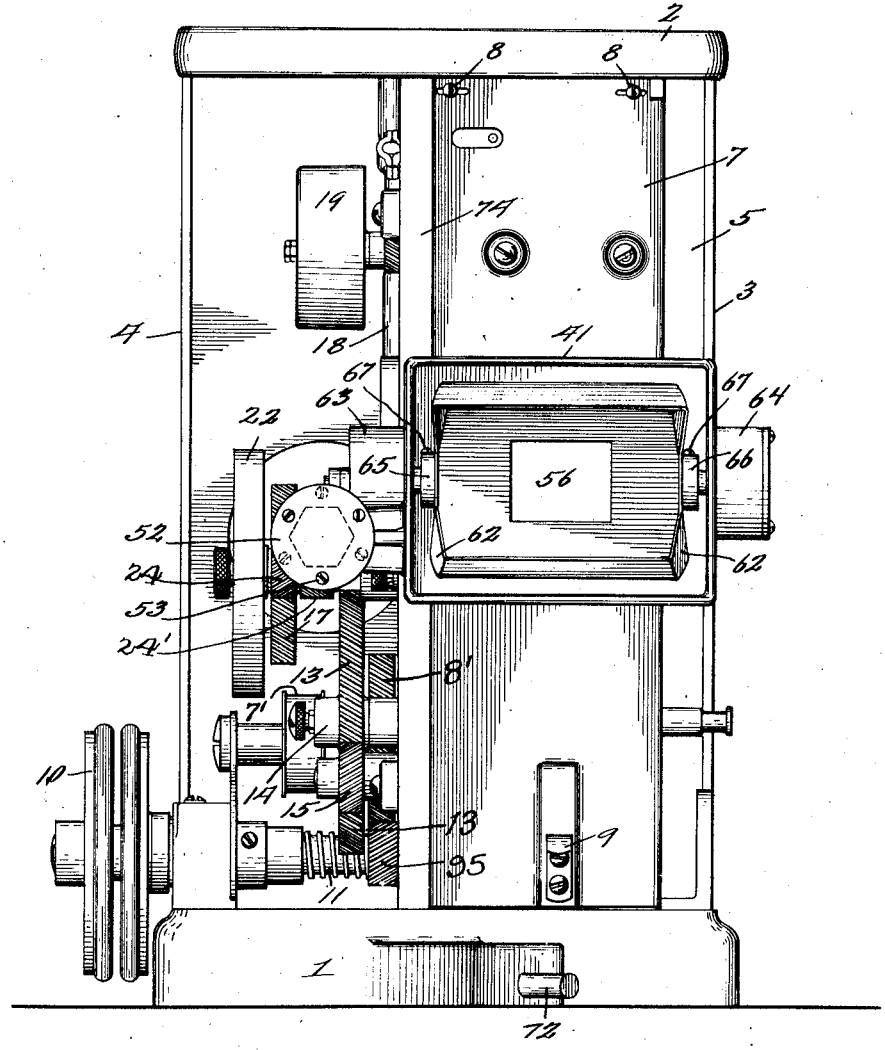
Fig. 3 is a view in front elevation of one type of projector illustrating the application of my invention.

The walls of this particular projector are made with glass panels at convenient locations in the wall areas so that the inner workings of the projector may be observed from the outside. The front wall 5 for its entire height is made with a removable panel 7 (see Fig. 3) known as a film gate. The same is removed by releasing the catches 8 at the top and the catch 9 at the bottom. This panel will be further referred to as the description proceeds.

The operating mechanism for the projector comprises a rotatable shaft 11 upon which is mounted a driving disc 10 which is driven by means of a motor in the usual manner. The shaft 11 also has a gear 95' adapted to rotate therewith and is in driving relation with the gear 8' mounted on the shaft 93. A gear 12 also mounted on the shaft 93 meshes with the main driving gear 13 mounted on the shaft 14, as best illustrated in Fig. 9. Thus, it will be seen that when motion is imparted to the shaft 11 by means of the driving connection between the disc and the motor (not shown), the driving gear 13 will be rotated. Any other suitable driving means may be used to drive the gear 13, if desired. The shaft 93 also carries the pulley 7' which is adapted to be connected to the take-up reel (not shown) by means of the belt (not shown) in the usual manner. This main drive gear 13 is also in mesh with the take-up sprocket gear 15 and it is also in mesh with a gear 91 on the shaft 16 which carries the gear 17. The diagonal shaft 18 is also provided with a gear 92 at its lower end meshing with the gear 90 on the shaft 16 and the diagonal shaft extends upwardly to mesh with a gear for driving the governor 19 which, in turn, actuates the lever 20 to impart a pull or thrust on the lever 21 for operating the fire shutter (not shown) in the usual manner positioned adjacent the opening in the film gate panel 7. The balance wheel 22 is mounted on a cam shaft 23 and on this shaft 23 is a star and cam mechanism for driving the intermediate sprocket in the film feeding mechanism in a well known manner. This star and cam mechanism is on the other side of the frame 73 and forms no part of the present invention.

This balance wheel mechanism is perhaps the most important part of the driving mechanism in the projector, so far as concerns my invention, since the power for driving the shutter is taken off the shaft 23 for the balance wheel 22. The balance wheel is driven by the gear 17, which, in turn, is driven by the main gear 13 from the shaft 11 of the drive disc 10.

The purpose of the star and cam mechanism driven by the shaft 23 is to rotate the film sprocket so as to pull down predetermined lengths of the film across the exposure opening of the projector. My shutter rotates in timed relation to this intermittent feed of the film and therefore intermittently intercepts the light beam to the film at proper timed stages in the feed of the film.

It is thought that the above description will be sufficient to explain the main parts of the driving mechanism so far as concerns its co-operation with my shutter and for a more complete description of the projector, if such is required, reference may be had to the motiograph projector, which is well known in the trade.

The shaft 23 is provided with a co-axial driven pinion 24, adjacent which is a pinion 24' which latter pinion is in constant mesh with the worm 25 of the shutter drive shaft 26. This shaft is journaled at one end in a sleeve 27 behind the worm gear 25 and just in advance of the worm 25 is a universal joint 28. One part of this universal joint comprises a tubular member 29 (see Fig. 5) having an axial bore in which the rod 30 is free to slide. To provide for rotation of the rod 30 with the sleeve 29, the rod is made with a longitudinal slot 31 for the reception of the pin 32 on the sleeve 29.

The forward end of the rod 30 is provided with a universal joint 33, one part of which carries the worm gear 34 which meshes with the gear 35 on the shutter spindle 36. Arranged in advance of the gear 34 is a rod 37 which slides through a bushing 38 in the sleeve 39 on the bracket 40 which is cast as an integral part of the shutter housing 41. The bushing 38 projects beyond the sleeve 39 and is screw-threaded, as at 42, and is received in an internally threaded collar 43 of the bearing housing 44. The end of the rod or shaft 37 is made with a disc-like abutment 45 which bears against the side of an inner ball race 46. The end 47 of the shaft beyond the disc-like abutment 45 supports the inner ball race 46 and the nut 48 is threaded on the reduced end of the shaft and, aided by a washer 49, clamps the inner ball race 46 between the nut and the disc-like abutment 45. The enlarged internal area of the bearing housing 44 accommodates the outer ball race 50 and also leaves an inner area 51 which may be packed with lubricant to keep the bearing well oiled. The side of the bearing housing is closed by a removable plate 52 which is secured by screws 53. This construction leaves the bearing housing rotatable upon its threaded engagement with the threaded end 42 of the bushing 38 so that by turning the bearing housing 44, a pull or thrust, as the case may be, depending on which way the housing is rotated, may be imparted to the rod or shaft 37, changing the timed relation of the shutter relative to the speed of the film.

When this adjustment is made, the keyed length of the drive comprising the longitudinally slotted rod 30 slides in the sleeve 29 and longitudinal movement of the worm 34 rotates the gear 35 to a limited extent, thus changing the angular position of the shutter so that the opening through the shutter is positioned in front of the film at a different time relative to the rotation of the shaft 23 which carries the star and cam mechanism for positioning the film in the beam of light. This is for the purpose of clearing up the picture and is not for framing the picture as the latter is usually accomplished by the adjustment of the frame 73, later to be described. This will be more readily understood when the construction of the shutter has been described.

By reference to Fig. 4, as a clear illustration, it will be seen that the film gate panel 7 is made with an opening 54. This is the opening through which the light beam is projected to the film, the film being fed through the projector behind this opening. My shutter is mounted on the outside of the panel 7 in front of the opening 54 and the mounting comprises a hooded enclosure 41, previously mentioned. The hood in this respect may be mounted to the panel 7 in any convenient way, such, for instance, as by the pins or knobs 55 which project from the face of the panel 7. The back wall of the hood is provided with an opening 56 concentric with the opening 54 and, in order to aid in keeping the metal of the panel 7 cool, the space between the back wall of the hood and the face of the panel is provided with a plate 57 which also has an opening 58 concentric with both the openings 56 and 54. This construction serves as a cooling fin, so to speak. The hood 41 may be cast with the bracket support 40 for the sleeve 39.

It will be seen that my improved shutter is preferably positioned between the film and the light source and not in front of the lens. The shutter, per se, in this respect, comprises a plurality of light intercepting walls 59 spaced-apart to leave a light passage between them and by the rotation of the shutter cutting the light beam in two transverse planes spaced-apart in the direction of the beam. The shutter in this respect being mounted for rotation in a plane transverse to the direction of the light and the walls 59 being on opposite sides of the axis of rotation of the shutter, entering the beam in opposite directions and thereby working simultaneously from two outer margins of the beam toward the center, in cutting off the light.

This result is illustrated to the best advantage in Fig. 4 wherein the optical center is indicated by the broken line 60. It will be noted that the axis of rotation 61 of the shutter is intersected by the optical center of the light beam which also passes through the center of the opening 54. The dotted line position of the walls 59 in Fig. 4 clearly shows how the light beam is cut in two transverse planes spaced-apart in the direction of the beam and how the walls perform to enter the beam in opposite directions, thereby working simultaneously from two outer margins of the beam toward the center, in cutting off the light.

More specifically, the walls of my shutter are preferably constructed as segments of a cylinder, spaced apart at their ends by the members 62 which are cast as an integral part of the walls or segments.

The shaft or spindle 36, heretofore referred to, for the shutter, is made in two lengths so that it will not extend through the shutter. The spindle length on one side is keyed to rotate with the gear 35 with an anti-friction bearing 63 for the same, and the spindle length on the opposite side of the shutter is journaled in a similar anti-friction bearing 64. Both spindles are directly connected to the shutter through collars 65 and 66 with set screws 67 on the collars for fixing the shutter to rotate with the spindles. In this way, the set screws 67 may be loosened which will leave the shutter free to move co-axially along the spindles for adjusting its transverse position relative to the openings through which the light is projected.

In order to create a circulation of air not only within the hood or housing 41 but also to direct a draft of cooling air to the film, the inner surface of each of the walls or segments 59 are made with longitudinal ribs 68. Furthermore, the side members 62 are deflected to provide fan-like blades. In this way, rotation of the shutter will not only keep the interior of the hood or housing 41 cool, or comparatively cool, but it will also direct a circulation of cool air into the projector against the film by drawing the cool air between the gate 54 and the chamber 41 and thereafter forcing the air heated by the light beam out of the front of the chamber in a direction away from the film instead of blowing the hot air heated by the beam of light against the film, thus keeping it cool and preventing the destructive effect of the heat from the light.

When it is desired to remove the panel 7, the shutter may be removed therewith as a unit. All that is necessary is to release the catches 8 and 9 on the panel and pull the panel away from the projector and, in doing so, the rod 30 will slide out of the sleeve 29 and this may be done without changing the timed relation of the shutter relative to the film drive as the pin and slot connection will always cause the sleeve 29 and rod 30 to bear the same relation to each other when the panel is replaced in the projector.

As illustrated in Figs. 7 and 8, the wall segments of the shutter are adjustable so that the leading edges of one of the segments may be brought closer to the following edge of the opposite segment should it be desirable to increase or decrease the area of the light opening between the wall segments. To accomplish this, extra pieces 69 are superimposed upon the walls 59 with slots 70 in the extra pieces provided for the reception of set screws 71 fixed to the wall segments 59 and sliding in the slots.

The projector is, of course, equipped with means for framing the film and this is done by a hand wheel on the shaft 72, (see Fig. 1). By rotating the shaft 72, the shifting frame 73 on which the film track is carried, may be elevated and lowered on the guide rods 74 and 75 by means of the elevating screw 89 operatively connected to the shaft 72 and the frame 73. Since this also elevates and lowers the position of the cam shaft 23, it is necessary to provide the universal joints 28 and 33 in the shutter drive shaft. The frame 73 is bounded by the edges 80, 81, 82 and 83 (Fig. 1) and has removable lugs 84 and 85 engaging the guide rod 74 and these co-operate with fixed lugs on the frame 73 which engage the opposite side of the guide rod 74. Screws 87 and 88 hold the lugs 84 and 85, respectively, in place on the frame 73. A lug 86 similarly engages the guide rod 75 for guiding the opposite edge of the frame.

Obviously those skilled in the art may make various changes in the construction and arrangement of parts without departing from the spirit and scope of the invention as defined by the claims hereto appended, and I therefore do not wish to be restricted to the precise construction herein disclosed.

Having thus described and shown an embodiment of my invention, what I claim and desire to secure by Letters Patent of the United States is:—

1. An exposure shutter for motion picture projectors comprising a plurality of light intercepting walls spaced apart to leave a light passage between them and by the rotation of the shutter cutting the light beam in two transverse planes spaced apart in the direction of the beam, and air circulating means associated with said shutter comprising ribs on the said walls and fan-like blades at the ends of said walls.

2. An exposure shutter for motion picture projectors comprising a plurality of light intercepting walls spaced apart to leave a light passage between them and by the rotation of the shutter cutting the light beam in two transverse planes spaced apart in the direction of the beam, and means for rotating said shutter in timed relation with the feed of the film to be projected comprising a drive shaft having a driving gear thereon meshing with a gear on a driven shaft in the film feeding mechanism, said drive shaft comprising telescoping sections, for separating the drive shaft and permitting removal of the shutter and its mounting from the projecting apparatus.

3. In a motion picture projector, a removable film gate panel having a light opening therein between the film and the projecting light source, an exposure shutter mounted on said panel in front of said opening, means for driving said shutter from the film feeding mechanism of the projector, an enclosing housing for said shutter, and means mounted on said panel and projector for forming a drive for said shutter which is automatically disconnected when said panel is removed from said projector.

4. In a motion picture projector, a removable film gate panel having a light opening therein between the film and the projecting light source, an exposure shutter mounted on said panel in front of said opening, means for driving said shutter from the film feeding mechanism of the projector, an enclosing housing for said shutter, and means for disconnecting said drive for removing the shutter with said panel, said shutter comprising a plurality of cylinder segments spaced apart and mounted for rotation about an axis transverse to the direction of the projecting light beam, and means on said shutter for creating a circulation of air within said housing and directing the same through the opening in said panel substantially as and for the purpose described.

5. An exposure shutter for motion picture projectors comprising a plurality of light intercepting walls, spaced apart to leave a light passage between them for a beam of light, means for moving said walls so that they cut the light beam in two transverse planes simultaneously, and air circulating means associated with said shutter comprising ribs on said walls.

6. In a motion picture projector, the combination with a frame, means mounted on said frame for driving the film of said motion picture projector, a panel removably mounted on said frame, a shutter on said panel, a splined shaft co-operating with a sleeve carrying a projection which enters the spline on said shaft for forming a driving connection between the driving means for the film and said shutter, said splined shaft and sleeve being immediately and automatically disconnected upon the removal of said panel from said frame.

7. An exposure shutter for motion picture projectors comprising a plurality of light intercepting walls spaced-apart to leave a passage therebetween for the beam of light in a motion picture projector, the rotation of the shutter cutting the light beam in two transverse planes spaced-apart in the direction of the beam, means for rotating said shutter in timed relation with the feed of the film to be projected comprising a drive shaft having a driving gear thereon meshing with a gear on a driving shaft in the film feeding mechanism, said drive shaft comprising telescoping sections adapted to be slidably connected to each other in but one manner so that when the sections of the drive shaft are disconnected by the removal of the shutter and its mounting from the projecting apparatus the same cannot be again connected except in the same relationship as they bore to each other before the shutter and its mounting were removed from the projecting apparatus.

8. A shutter for motion picture projectors comprising a rotatable member having spaced walls adapted to rotate about an axis transversely of the light beam in the motion picture projector, and an air circulating means on said shutter comprising inclined members at opposite ends of said shutter.

9. A shutter for motion picture machines comprising a substantially cylindrical member having closed ends shaped to form air circulating means, opposed openings in the cylindrical surface of said cylindrical member, and ribs extending longitudinally of said rotatable members to form a supplemental additional air circulating means.

10. A motion picture projector comprising film feeding means, a frame upon which said film feeding means is mounted, a panel mounted on said frame, a rotatable shutter and air circulating means mounted on said panel, a housing mounted on said panel in which housing said shutter is rotatable, said housing having a relatively small opening at one side thereof adjacent a similar opening in the panel for permitting the beam of light produced by the source of light in the motion picture machine to pass therethrough, the opposite side of said housing having a second opening substantially larger than said first opening so as to cause the air to circulate from said first opening adjacent the panel through said second opening.

11. In a motion picture machine, the combination with a frame, film operating means mounted within said frame and having means for moving the film adjacent an open side of said frame, a panel adapted to close said open side of said frame having an opening through which the light from the projecting machine is adapted to pass, said opening being adjacent the film when the panel is in place, a housing mounted on said panel having a small opening in one side thereof adjacent the opening in the panel and being substantially unclosed at another side thereof, a shutter rotatably mounted in said housing on an axis transverse to the beam of light which passes through said projecting machine, air circulating means on said shutter adapted to draw the air through said opening in said housing and force said air through said housing and out of said side of said housing which is substantially entirely unclosed.

12. In a motion picture machine, the combination with a frame, film operating means mounted within said frame and having means for moving the film adjacent an open side of said frame, a panel adapted to close said open side of said frame having an opening through which the light from the projecting machine is adapted to pass, said opening being adjacent the film when the panel is in place, a housing mounted on said panel having a small opening in one side thereof adjacent the opening in the panel, a shutter rotatably mounted within said housing, spaced walls on said shutter adapted to cut a beam of light passing through said projecting machine in two transverse planes, air circulating means on said shutter adapted to draw the air through the opening in said housing adjacent the panel and force it out through the opposite side of said housing which is substantially entirely unclosed, and adjustable means for connecting said shutter to said film operating means so that said shutter operates in timed relation to the movement of the film past the opening in said panel.

13. In a moving picture projector, the combination with film feeding mechanism, of a shutter rotatable about an axis transversely to the beam of light which is adapted to be projected through the film, a housing for said rotatable shutter having the walls thereof arranged relatively close to the said shutter, said housing being closed except at two sides thereof, one of said sides having a relatively small opening therein and the other of said sides being substantially unclosed, and air circulating means on said shutter for circulating the air outwardly from the axis thereof, said shutter housing acting as means for directing the air circulated by the shutter out of said side which is substantially unclosed instead of through the relatively small opening.

14. A shutter for motion picture projectors comprising a housing adapted to be positioned adjacent the film and having an opening therein through which the beam of light of the motion picture projector is adapted to be projected into engagement with the film, the opposite side of said housing having a relatively large opening therein as compared with said first opening, a rotatable shutter arranged within said housing between said openings and rotatable about an axis transversely to the beam of light, said shutter having light intercepting walls thereon and air circulating means carried thereby for circulating the air within the housing, and means for rotating said shutter, said housing being constructed to direct the air circulated by said shutter out of said second opening, said shutter being adapted to be arranged between the source of light and the film.

15. A shutter for motion picture machines comprising a rotatable member having spaced side walls, ribs extending longitudinally of said side walls in the direction of the axis of rotation of said rotatable member to form an air circulating means, and a housing for substantially enclosing said rotatable member on all sides except two opposed sides, said two opposed sides having openings of substantially different sizes so that the air circulated by said ribs is projected through said larger opening.

16. In a motion picture machine, the combination with film feeding mechanism, of a shutter, a panel upon which said shutter is mounted and which is removable from the film feeding mechanism, a gear rigid with said shutter, a second gear rigid with a shaft rotatably mounted in a bearing which holds said shaft in a predetermined relation with reference to said first gear to thereby hold said second gear in mesh with said first gear, a detachable connection between said film feeding mechanism and said shaft for driving said shaft from said film feeding mechanism, but permitting removal of said shutter and panel from said film feeding mechanism when desired, and means for moving said shaft longitudinally of its axis to thereby vary the position of said gears with relation to each other, said gears having teeth thereon such that longitudinal movement of said shaft causes rotation between said gears.

17. In a motion picture projector, the combination with a frame, mechanism on said frame for driving the film, a quickly detachable panel removably mounted on said frame, a shutter mounted on said panel, a detachable driving connection between said shutter and the means for driving said film, said driving connection being such that it is automatically disconnected from the driving means for the film when the panel is removed from said frame, and means forming part of said driving connection for locating the parts of the driving connection in proper operative relation with each other on the reconnecting of said connection when said panel is replaced.

18. A shutter for motion picture projectors equipped with a source of light, and film feeding mechanism comprising a member rotatable about an axis transversely to the beam of light produced by said source of light, means on said rotatable member for intermittently interrupting the rays of light passing from said source of light to the film, inclined blades on said last mentioned means for circulating the air heated by the beam of light between the source of light and the film in a direction toward the source of light so that cooling air will be drawn into the beam of light adjacent the film as the heated air is moved away therefrom, and ribs on said means for intermittently interrupting the rays of light for supplementing the action of said inclined blades to increase the circulation of the air in the manner described.

In testimony whereof I have signed my name to this specification on this 29th day of February, A. D. 1928.

EMIL J. WIENKE.